US006125343A

United States Patent [19]

Schuster

[11] Patent Number: 6,125,343

[45] Date of Patent: Sep. 26, 2000

[54] SYSTEM AND METHOD FOR SELECTING A LOUDEST SPEAKER BY COMPARING AVERAGE FRAME GAINS

[75] Inventor: Guido M. Schuster, Des Plaines, Ill.

[73] Assignee: 3Com Corporation, Santa Clara, Calif.

[21] Appl. No.: 08/865,399

[22] Filed: May 29, 1997

[51] Int. Cl.[7] .......... G06F 7/08

[52] U.S. Cl. .......... 704/201; 348/15

[58] Field of Search .......... 704/225, 226, 704/208, 270; 381/92, 94.5, 107, 119; 348/15; 200/34

[56] References Cited

U.S. PATENT DOCUMENTS

| | | | |
|---|---|---|---|
| 3,992,584 | 11/1976 | Dugan | 381/119 |
| 4,387,457 | 6/1983 | Munter | 370/267 |
| 4,388,717 | 6/1983 | Burke | 370/261 |
| 4,495,616 | 1/1985 | Shuh | 370/263 |
| 4,864,627 | 9/1989 | Dugan | 381/119 |
| 5,291,558 | 3/1994 | Ross | 381/119 |
| 5,317,672 | 5/1994 | Crossman et al. | 704/229 |
| 5,402,500 | 3/1995 | Sims, Jr. | 381/119 |
| 5,414,776 | 5/1995 | Sims, Jr. | 381/119 |
| 5,473,363 | 12/1995 | Ng et al. | 348/15 |
| 5,657,422 | 8/1997 | Janiszewski et al. | 704/229 |
| 5,696,873 | 12/1997 | Bartkowiak | 704/216 |
| 5,765,130 | 6/1998 | Nguyen | 704/233 |

OTHER PUBLICATIONS

International Telecommunication Union, "Dual Rate Speech coder For Multimedia Communications Transmitting at 5.3 and 6.3 kbit/s: ITU–T Recommendation" G.723.1 (Mar., 1996).

Ciaran McElroy—"Speech Production and Perception" http://wwwdsp.ucd.ie/speech/tutorial/speech_coding/vocoding.html (Nov. 28, 1995).

Ciaran McElroy—"Hybrid Coding" http://wwwdsp.ucd.ie/speech/tutorial/speech_coding/vocoding.html (Nov. 28, 1995).

Ciaran McElroy—"Sampling" http://wwwdsp.ucd.ie/speech/tutorial/speech_coding/vocoding.html (Nov. 28, 1995).

Ciaran McElroy—"Quantization" http://wwwdsp.ucd.ie/speech/tutorial/speech_coding/vocoding.html (Nov. 28, 1995).

Ciaran McElroy "Waveform" http://wwwdsp.ucd.ie/speech/tutorial/speech_coding/vocoding.html (Nov. 28, 1995).

Ciaran McElroy—"Vocoding" http://wwwdsp.ucd.ie/speech/tutorial/speech_coding/vocoding.html (Nov. 28, 1995).

Oppenheim. Discrete–Time Signal Processing. Prentice Hall. pp. 406–430, 1989.

*Primary Examiner*—Edward R. Cosimano
*Assistant Examiner*—M. David Sofocleous
*Attorney, Agent, or Firm*—McDonnell Boehnen Hulbert & Berghoff

[57] ABSTRACT

An improved system for identifying the loudest speech signal in a G.723.1 based audio teleconferencing link is disclosed. The system selects the loudest of several analog audio signals by directly analyzing the encoded G.723.1 bit streams representing those signals, rather than by decoding the encoded speech signal in the G.723.1 bit streams and then re-encoding the signal as a selected output bit stream. The system uses the excitation gain parameters encoded in G.723.1 frames to approximate frame gains for respective bit streams and then estimates a short term speech energy for each bit stream by averaging the approximate frame gains over time. The system then compares the estimated speech energy levels and outputs to each conference participant the signal with the highest estimated speech energy as the next portion of an output signal.

34 Claims, 4 Drawing Sheets

SYSTEM AND METHOD FOR SELECTING A LOUDEST SPEAKER BY COMPARING AVERAGE FRAME GAINS

BACKGROUND OF THE INVENTION

The present invention relates generally to systems that employ the transmission of compressed digital audio and, more particularly, to systems that identify and select the loudest speaker from among several incoming bit streams. The invention is particularly suitable, for example, for use in connection with multimedia teleconferencing systems in which speech signals emanating from each of multiple speakers are compressed by linear predictive coding.

In modern telecommunications systems, audio and video information is frequently transmitted from one location to another in the form of compressed digital data representative of analog signals. Compressed digital data may be carried in binary groups referred to as packets, where each packet typically includes bits representing control information, bits comprising the data being transmitted and bits used for error detection and correction. In order to ensure that the receiving end of the system properly interprets the data provided by the transmitting end, the data must generally comply with established industry standards.

In multimedia conferencing systems, audio and video information may simultaneously be transmitted according to standard protocols under which a portion of the transmission signal represents audio information, and a portion of the signal represents video information. To generate the audio or voice portion of the transmission signal from analog speech, an analog speech signal is typically sampled and subjected to a voice coder, or "vocoder," which converts the sampled signal into a compressed digital audio signal. Often, such vocoders take the form of code excited linear predictive, or "CELP," models, which are complex algorithms that typically use linear prediction and pitch prediction to model speech signals. Compressed signals generated by CELP vocoders include information that accurately models the vocal track that created the underlying speech signal. In this way, once a CELP-coded signal is decompressed, a human ear may more fully and easily appreciate the associated speech signal.

While CELP vocoders range in degree of efficiency, one of the most efficient is that defined by the G.723.1 standard, as published by the International Telecommunication Union, the entirety of which is incorporated herein by reference. Generally speaking, G.723.1 works by partitioning a 16 bit PCM representation of an original analog speech signal into consecutive segments of 30 ms length and then encoding each of these segments as frames of 240 samples. Each G.723.1 frame consists of either 20 or 24 bytes, depending on the selected transmission rate. By design, G.723.1 may operate at a transmission rate of either 5.3 kilobits per second or 6.3 kilobits per second. A transmission rate of 5.3 kilobits per second would permit 20 bytes to represent each 30 millisecond segment, whereas a transmission rate of 6.3 kilobits per second would permit 24 bytes to represent each 30 millisecond segment.

Each G.723.1 frame is further divided into four sub-frames of 60 samples each. For every sub-frame, a 10th order linear prediction coder (LPC) filter is computed using the input signal. The LPC coefficients are used to create line spectrum pairs (LSP), also referred to as LSP vectors, which describe how the originating vocal track is configured and which therefore define important aspects of the underlying speech signal. In a G.723.1 bit stream, each frame is dependent on the preceding frame, because the preceding frame contains information used to predict LSP vectors and pitch information for the current frame.

For every two G.723.1 sub-frames (i.e., every 120 samples), an open loop pitch period (OLP) is computed using the weighted speech signal. This estimated pitch period is used in combination with other factors to establish a signal for transmission to the G.723.1 decoder. Additionally, G.723.1 approximates the non-periodic component of the excitation associated with the underlying signal. For the high bit rate (6.3 kilobits per second), multi-pulse maximum likelihood quantization (MP-MLQ) excitation is used, and for the low bit rate (5.3 kilobits per second), an algebraic codebook excitation (ACELP) is used.

Like other voice coders, G.723.1 has many uses. As an example, G.723.1 is used as the audio-coder portion of two of the more common multimedia packet protocols, H.323 and H.324. The H.323 protocol defines packet standards for multimedia communications over local area networks (LANs). The H.324 protocol defines packet standards for teleconference communications over analog POTS (plain old telephone service) lines. H.323 and H.324 are frequently used to compress audio and video information transmitted in multimedia video conferencing systems. However, these packet protocols may equally be used in other contexts, such as Internet-based telephony. For audio-only applications, the video portion of the coding may be excluded, while maintaining the work of the audio coder such as G.723.1.

Generally speaking, teleconferencing involves multiple speakers and therefore requires a mechanism to distribute to each speaker one or more signals arising from the other speakers. For this purpose, an audio bridge is typically provided. In its most trivial form, an audio bridge may receive signals from each speaker and forward those signals to each of the other speakers. For instance, given speakers A, B and C each generating G.723.1 bit steams, the audio bridge may send the streams from A and B to C, the streams from A and C to B, and the streams from B and C to A. While this system may work well in the presence of few conference participants, it will be appreciated that the system would require increased bandwidth as the number of participants increases.

In a more advanced form, an audio bridge may decode each of the incoming G.723.1 bit streams and then, based on the underlying PCM signals, re-encode an output G.723.1 bit stream to distribute to each of the conference participants. For example, the audio bridge may decode all of the incoming bit streams and mix together the underlying PCM signals, for example, with a standard audio mixer. The audio bridge may then re-encode the composite signal and send the re-encoded signal to all of the participants. As will be appreciated, however, this task may become computationally expensive, especially as the number of conference participants increase. Therefore, as the number of likely participants increases, this option becomes less desirable.

As an alternative, the audio bridges in existing teleconferencing systems customarily select only the loudest incoming signal, or group of loudest incoming signals, to send to each of the conference participants. As an example, an audio bridge may decode all of the incoming bit streams and then measure the amplitudes of the PCM signals. Based on this measurement, the bridge may select, say, the top three loudest signals, mix those signals together and re-encode the composite analog signal into an outgoing G.723.1 bit stream for distribution to all of the participants.

Alternatively, as is most customary, the system may be configured to send only the speech signal of the loudest party to each of the participants. Distributing only the loudest speech signal beneficially maintains symmetric bandwidth and increases intelligibility. More specifically, by distributing only the loudest speech signal, the transmission lines carry signals of about equal bandwidth both to and from the participants. Additionally, each participant will generally hear only the loudest of the speech signals and will therefore be able to more readily ascertain what is being conveyed.

To perform this function, a typical audio bridge decodes each G.723.1 stream of data received from each speaker. The audio bridge then analyzes the underlying PCM signal in order to determine an energy level of the signal. By next comparing the estimated energy levels of the respective analog signals, the bridge may select the loudest speaker. The bridge then re-encodes the selected loudest speech signal using G.723.1 and sends the encoded signal to all of the participants. As different speakers in the conference become the loudest speaker, the audio bridge simply switches to select a different underlying PCM signal to encode as the current G.723.1 output stream.

Unfortunately, G.723.1 is a relatively complex and costly compression algorithm. Multiple operations are required to decode each frame of G.723.1 data into the underlying 30 milliseconds of audio. Further, as with any lossy compression algorithm, every useful compression/decompression cycle will always result in some loss of signal quality. This is particularly the case with respect to compressed speech signals, because complete speech signals carry complex information regarding voice patterns. Therefore, each time an existing audio bridge decodes (or decompresses) a G.723.1 bit stream and re-encodes (or re-compresses) an outgoing G.723.1 bit stream, some loss of signal quality is likely to result.

In addition to G.723.1, other useful CELP coders are known to those skilled in the art. These CELP coders presently include the G.728 and G.729 protocols, although numerous other vocoders may be known or may be developed in the future. G.728 and G.729 are likely to suffer from the same deficiencies as described above with respect to G.723.1. In particular, like G.723.1, these protocols also involve computationally expensive compression algorithms and may result in degraded audio quality upon successive encode-decode cycles.

In view of these deficiencies in the existing art, there is a growing need for an improved system of selecting the loudest of several encoded audio signals represented by G.723.1 or other similar encoded bit streams.

SUMMARY OF THE INVENTION

The present invention provides an improved system for identifying the loudest speech signal in a teleconferencing link in which audio signals are encoded according to a protocol such as G.723.1. The invention advantageously selects the loudest of several analog audio signals, or ranks the loudness level of multiple signals, by directly analyzing the encoded bit streams representing those signals, rather than by decoding the bit streams and re-encoding selected bit streams for distribution to the conference participants.

The invention recognizes that frames of a CELP-coded bit stream such as G.723.1 include an encoded excitation gain parameter that contains information about the underlying speech energy. Taking into account this excitation gain parameter, the invention computes an estimate of the loudness of the encoded speech over the course of several frames of data. Still without decoding the speech signal portions of the incoming bit streams, the invention then compares its estimates of loudness for the respective signals and determines which bit stream represents the loudest underlying analog audio signal. Once the invention thus selects the incoming bit stream that represents the loudest analog audio signal, the invention switches that bit stream into an ongoing output signal. The invention then maintains the selected input bit stream as the output bit stream until an alternate selection of a loudest input signal is made.

Accordingly, a principal object of the present invention is to provide an improved system for selecting the loudest audio signal among several bit streams encoded under a protocol such as G.723.1. Further, an object of the present invention is to provide an improved teleconferencing link having a system for efficiently detecting the loudest incoming speech signal from among several such bit streams, and for passing the selected signal to each conference participant. Alternatively, an object is to provide an improved system for ranking the loudness of multiple incoming speech signals each represented by a CELP-coded bit stream. Still further, an object of the present invention is to provide an improved audio bridge including a simple, fast and robust algorithm for selecting the loudest speech signal from among several such bit streams. These, as well as other objects and advantages of the present invention will become readily apparent to those skilled in the art by reading the following detailed description, with appropriate reference to the accompanying drawings.

BRIEF DESCRIPTION OF THE DRAWINGS

A preferred embodiment of the present invention is described herein with reference to the accompanying drawings, in which.

DETAILED DESCRIPTON OF THE PREFERRED EMBODIMENT

Figure 1:
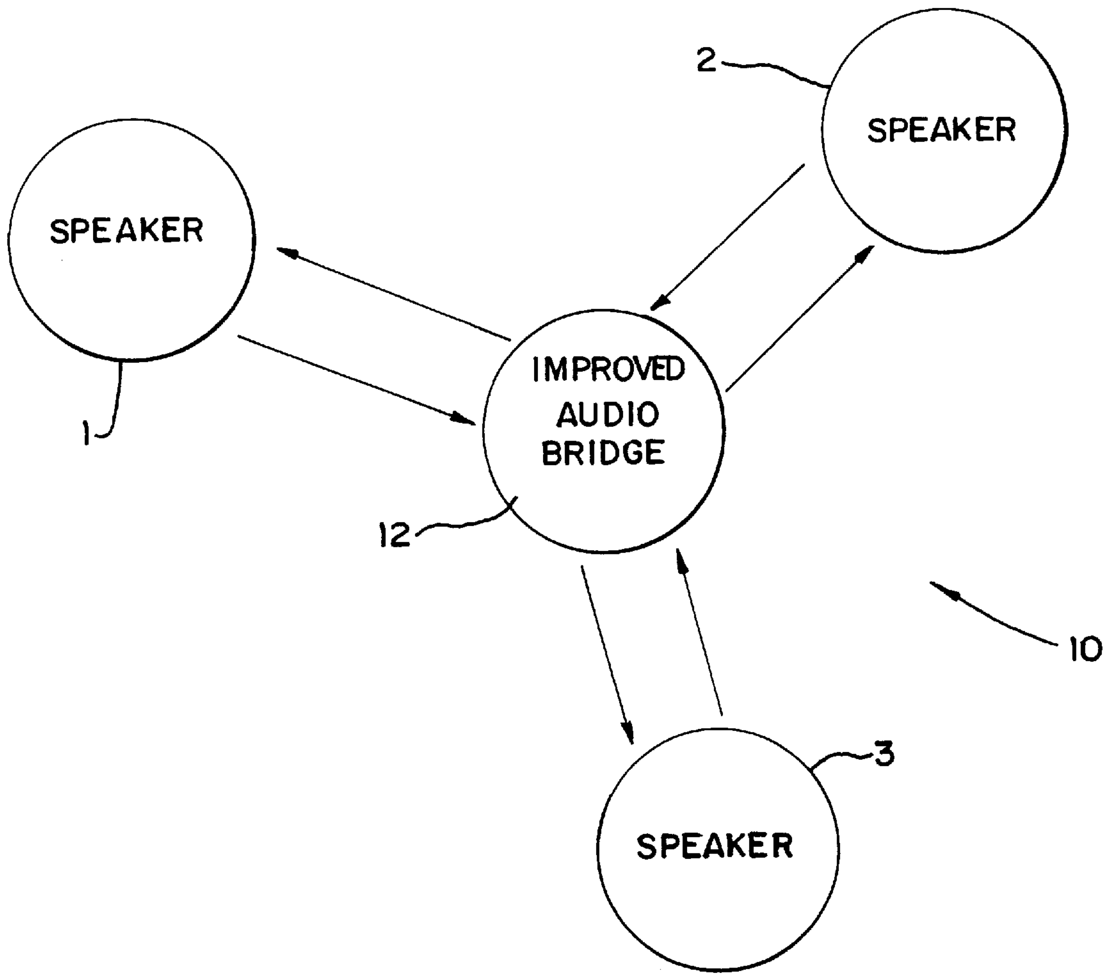
FIG. 1 schematically illustrates an exemplary teleconferencing system including an audio bridge and three speakers.

Referring to the drawings, FIG. 1 schematically illustrates the configuration of a teleconferencing link 10. In this example configuration, three speakers 1, 2, 3 are positioned remotely from each other and are interconnected to one another through an audio bridge 12. In the preferred embodiment of the present invention, speakers 1, 2 and 3 are each respectively interconnected to bridge 12 by a pair of exchange grade cables or telephone lines. Each of the speakers generate voice signals, which are then compressed into encoded bit streams and transmitted to audio bridge 12. In the preferred embodiment, the G.723.1 vocoder is used to encode these voice signals. However, it will be appreciated that other vocoders may be used and may suitably fall within the scope of the present invention as described below.

Audio bridge 12 preferably includes a conventional microprocessor and a memory or other storage medium for holding a set of machine language instructions geared to carry out the present invention. Additionally, audio bridge 12 customarily includes one or more modems designed to receive the encoded bit streams arriving from the various conference participants and/or transmit bit streams to the conference participants. As will be described below, a set of machine language instructions is provided to analyze each of the incoming bit streams, in order to estimate relative energy levels between the underlying voice signals. The bridge thereby identifies which bit stream represents the loudest underlying signal and then outputs that selected bit stream via the modem or modems to all of the conference participants until a new loudest signal is selected.

Alternatively, the present invention may beneficially employ a distributed configuration. In this configuration, the modem or modems handling the incoming bit streams all share a common memory in which an identification of a current "loudest" output stream is stored. Each modem may then execute its own copy of the machine language instructions to determine whether its incoming bit stream represents a speech signal that is loud enough to replace the signal represented by the currently selected bit stream. Additionally, each modem in this configuration preferably includes a routing algorithm. In this way, each modem independently determines whether its incoming bit stream should replace the currently selected bit stream for output to all conference participants, and, if so, the modem routes its incoming bit stream through each of the other modems for output to the conference participants.

In FIG. 1, the arrows extending between each of the speakers 1, 2, 3 and the bridge 12 represent incoming and outgoing bit streams. At any instant in time, audio bridge 12 must judge which of the incoming G.723.1 bit streams represents the voice of the loudest speaker. Audio bridge 12 then routes a bit stream representative of that voice back to all of the participants in the teleconferencing session. As noted above, existing audio bridges accomplish this function by decoding each of the encoded speech signals represented by the incoming G.723.1 signals and analyzing the decoded speech signals to determine which signal is the loudest. Existing audio bridges then re-encode the selected analog signal into a G.723.1 format and pass the re-encoded signal back to the participants as an output signal. This procedure necessarily causes some signal degradation.

Unlike the existing art, the present invention beneficially selects the loudest analog audio signal instead by directly analyzing the incoming G.723.1 bit streams, without decoding the speech signal portions of those bit streams. To do so, the present invention directly manipulates and analyzes certain coded parameters contained within the G.723.1 bit streams, and the invention thereby efficiently estimates the loudness of the underlying analog signal for purposes of identifying the loudest signal or ranking the loudness of multiple signals.

In the preferred embodiment, as will be described in more detail below, the invention cycles through each incoming bit stream (or operates in a distributed configuration as described above) and extracts excitation parameters from the current frame in the bit stream. The invention then uses the excitation parameters to estimate a frame gain associated with the underlying signal, and the invention computes an average frame gain over time for the given bit stream by employing an infinite impulse response filter. Finally, the invention determines whether the current average frame gain is sufficiently higher than the average frame gain of the presently selected "loudest" signal, and, if so, the invention substitutes the current stream as the stream to be output to each of the conference participants.

As discussed above, G.723.1 is a code efficient linear predictive vocoder that is capable of operating at two different rates, 5.3 kilobits per second or 6.3 kilobits per second. As noted, to generate a G.723.1 bit stream from an analog speech signal, the analog speech signal is sampled at 8 kHz and quantized with 16 bits per sample. At that point, the original bit rate of the signal is thus 128 kilobits per second. G.723.1 then selects consecutive groups of 240 samples representative of 30 milliseconds of speech and represents each group using only 20 or 24 bytes, at either 5.3 kilobits per second or 6.3 kilobits per second. As a result, G.723.1 consists of consecutive transmission frames of data, each representing 30 milliseconds of speech. Further, as discussed above, each of these frames is in turn divided into four sub-frames of 60 samples each.

Each sub-frame of G.723.1 in turn includes a coded excitation gain parameter that represents a gain or excitation energy associated with the given sub-frame. This value may be referred to as a sub-frame excitation energy or sub-frame gain, sfg. By extracting and manipulating the sub-frame gains within a given frame, it is possible to determine the gain associated with the frame, which may be referred to as the frame excitation energy or frame gain, fg. The theory of CELP vocoders provides that the frame excitation energy of an encoded speech signal is strongly correlated with the total energy of the decoded speech signal represented by the given frame. Therefore, by comparison of frame excitation energy levels associated with multiple CELP-coded bit streams, it becomes possible to estimate which bit stream represents the underlying speech signal with the highest energy level, or the loudest underlying speech signal.

The present invention beneficially employs this relationship between frame excitation energy and speech signal energy, to estimate the speech energy of the underlying analog signal for a set of frames, without having to decode the G.723.1 bit stream. The invention then compares the estimated energy levels for the frames of multiple incoming signals and selects the loudest of these signals to output.

To compare the frame gains from multiple incoming bit streams, it is of course necessary to first determine the frame gains for the respective signals. For theoretical reasons, it has been determined in general that the frame excitation energy or frame gain may be represented as the sum of the squared sub frame excitation energies or sub frame gains. Therefore, generally speaking, a comparison of frame gains in multiple G.723.1 bit streams should require an audio bridge to square each of the sub frame gains in each frame under analysis and to sum the squared values. As those or ordinary skill in the art will appreciate, however, the step of squaring multiple figures and summing the squares is a complex and computationally expensive task, because squaring involves relatively burdensome multiplication operations.

In a general embodiment, in order to more efficiently derive the frame gain associated with a given G.723.1 frame, the present invention avoids the computational burden involved with squaring each sub-frame gain. Instead, the present invention approximates the frame gain by simply adding together each of the associated sub-frame gains. Experimental results show that no performance loss occurs as a result of this approximation.

In the specific context of G.723.1, the present invention extracts each sub-frame gain by reading and manipulating appropriate bits from the given frame and using the resulting value to obtain the sub-frame gain from a fixed codebook. G.723.1 packs data differently depending on whether the data is compressed at a rate of 5.3 kilobits per second or a rate of 6.3 kilobits per second. The applicable data rate is designated by the value of the second bit in the given frame. Regardless of the rate, in order to determine a sub-frame gain, the system reads a value ("Temp") defined by a specified series of 12 bits from the bit stream, and the system divides this value 24. The system then uses the remainder from this division as an index to look up the sub-frame gain in a fixed codebook table, which G.723.1 refers to as FcbkGainTable.

In the event the frame is operating at 6.3 kilobits per second, several intermediate steps are required. First, the system must determine the open loop pitch associated with each pair of sub-frames. According to G.723.1, the open loop pitch for the first two sub-frames equals the sum of 18 plus the value defined by bits 27 through 33 in the frame. The open loop pitch for the second two sub-frames equals the sum of 18 plus the value defined by bits 36 through 42 in the frame. In turn, once the system has read the value of Temp for the given sub-frame, if the open loop pitch for the given sub-frame is less than 58, then the system sets the first five bits of Temp to zero. The system may then divide the resulting value of Temp by 24 and apply the remainder to the fixed codebook table to obtain the sub-frame gain. As the system obtains the sub-frame gain for each sub-frame, in the preferred embodiment, the system adds these sub-frame gains together to obtain an approximation of the current frame gain.

As those of ordinary skill in the art will appreciate, the energy level of a typical speech signal is highly unstationary over time. At the same time, each frame of a G.723.1 bit stream represents only 30 milliseconds of a speech signal. Consequently, it has been determined that an energy level comparison between discrete frames of multiple G.723.1 bit streams is unlikely to accurately reflect the real difference between the underlying energy levels.

Recognizing this non-stationary behavior, the present invention beneficially compares short-term averages of speech over time, rather than comparing individual 30 millisecond blocks of speech at a time. To do so, the invention preferably applies a first order infinite impulse response (IIR) filter to the frame gain of each G.723.1 bit stream and compares the outputs of the respective filters. A first order IIR filter works with minimal delay and provides a reliable output. In this regard, experimental results establish that a geometric forgetting factor, or decay factor, of 0.93 in the first order IIR will result in a robust algorithm that will allow an accurate, ongoing comparison between loudness associated with multiple G.723.1 bit streams.

Given this short-term average frame gain for a given bit stream, the present invention then compares that gain to the short-term average frame gain associated with the bit stream currently selected as representing the "loudest" speech signal. Generally speaking, if the invention determines that the short-term average frame gain for the incoming bit stream is greater than the short-term average frame gain of the currently selected bit stream, then the invention substitutes the incoming bit stream as the new currently selected output bit stream. Because G.723.1 operates in units of frames, the invention preferably switches from one selected output bit stream to another at a frame boundary.

The present invention further recognizes that, during a conventional teleconferencing session, multiple participants may be speaking equally loudly. Consequently, in order to achieve reliable, consistent switching, the present invention is therefore configured to avoid switching rapidly between different speakers when the speakers carry almost the same energy. To this end, the invention preferably switches to a new speaker only if the invention estimates a short term energy average of more than 1.5 times that of the currently selected speaker.

Incorporating the above criteria, a preferred embodiment of the present invention may be phrased in pseudo-code as follows, where the variable "select" identifies the bit stream currently selected to be the audio bridge output stream:

TABLE 1

GENERAL APPLICATION OF PREFERRED EMBODIMENT

```
Select =1
For each bit stream [i],
    For each frame [n] (30 ms),
        Initial the frame gain (fg): fg[i][n] = 0
        For each sub frame [k] (7.5 ms)
            Decode sub frame gain (sfg), and add to
            frame gain: fg[i][n] = fg[i][n] + sfg[i][n][k]
        Calculate average frame gain (afg):
        afg[i][n] = 0.93*afg[i][n−1] + 0.07*fg[i][n]
        If afg[i][n] > 1.5* afg[select][n] then select = i
```

Figure 2:
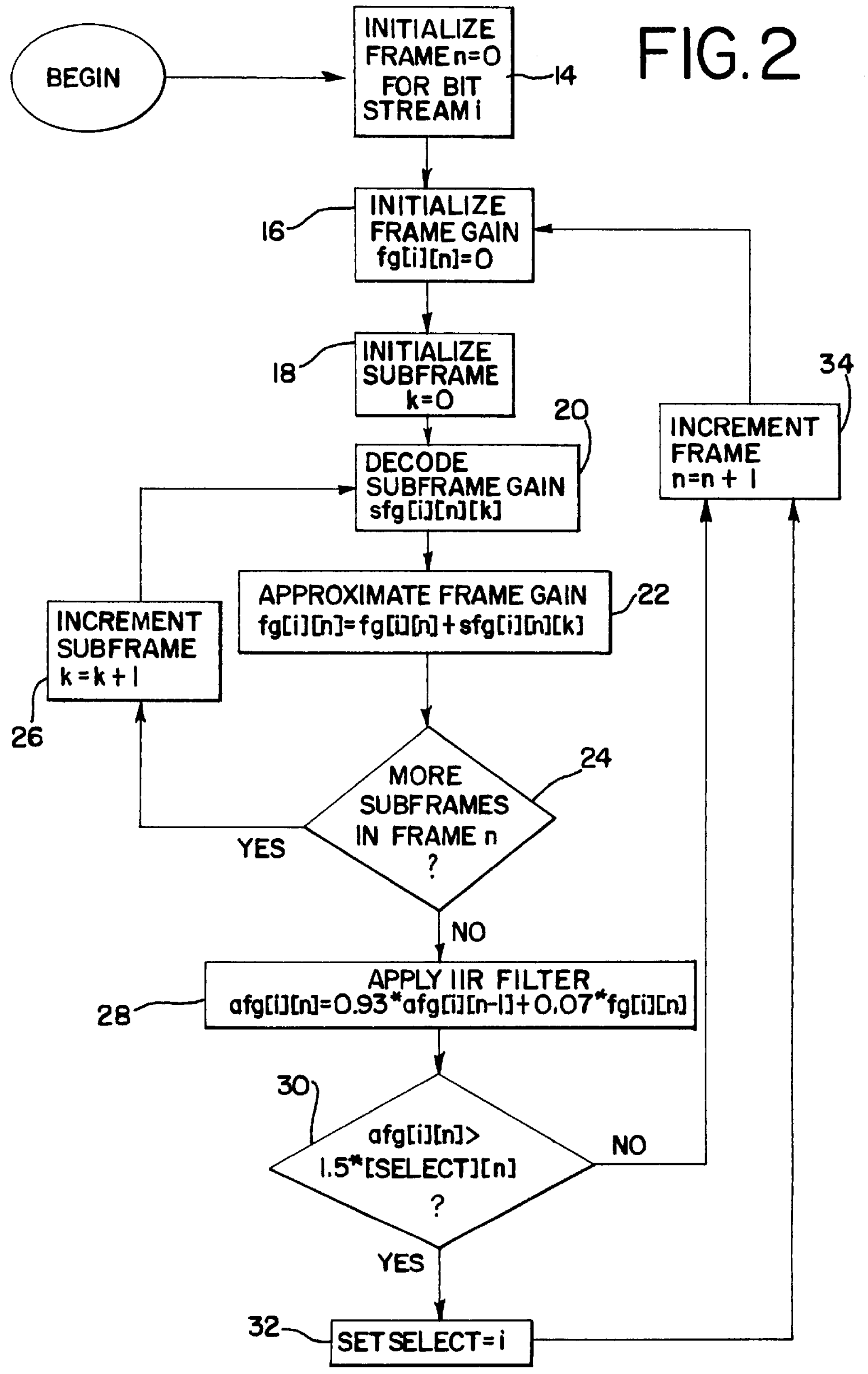
FIG. 2 depicts a flow chart of an algorithm employing a preferred embodiment of the present invention.
Figure 3A:
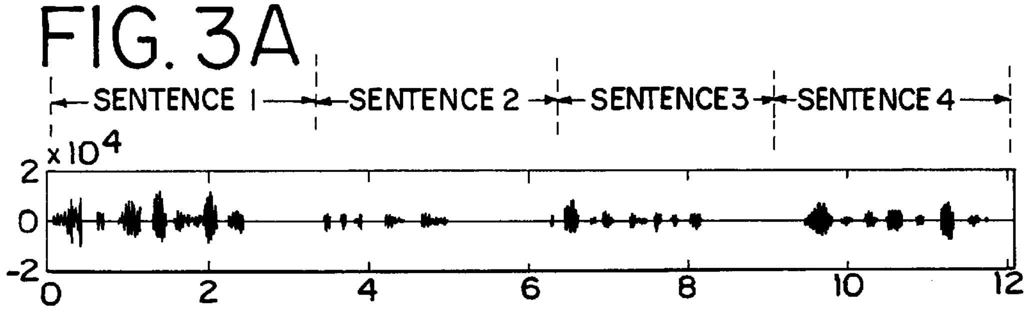
FIG. 3 depicts a series of graphs showing experimental results achieved by a preferred embodiment of the present invention.
Figure 3B:
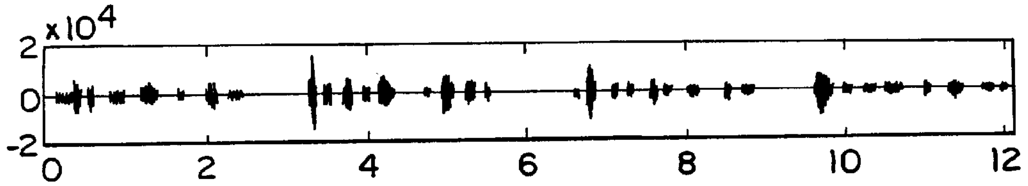
Figure 3C:
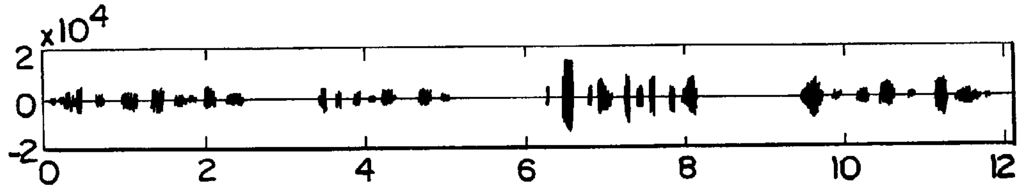
Figure 3D:
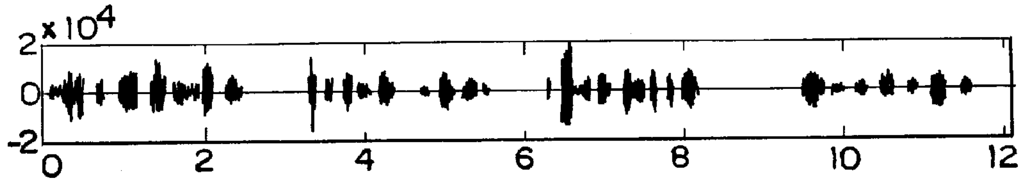
Figure 3E:
Figure 3F:
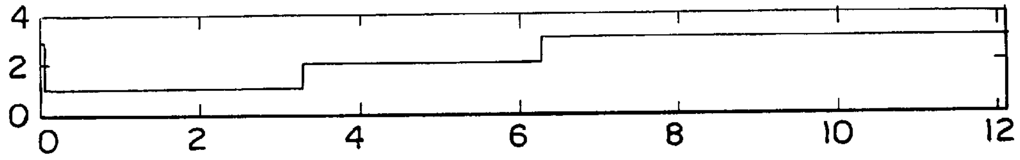

FIG. 2 is a flow chart illustrating this preferred embodiment of the present invention as applied to each bit stream i. Referring to FIG. 2, at step 14, the invention preferably begins with the first frame of the bit stream, by initiating n=1. At step 16, the invention initializes the frame gain for frame n to zero. In turn, at step 18, the invention begins with the first sub-frame of frame n by initializing k=1.

At step 20, the invention decodes the sub-frame gain for the current sub-frame k. The invention then adds that sub-frame gain to the current frame gain, at step 22. At step 24, the invention decides whether all sub-frames for the current frame n have been considered. If more sub-frames remain to be considered, at step 26, the invention increments to the next sub-frame in frame n, and the invention returns to step 20.

Once all sub-frames have been considered, the invention next approximates the short-term average frame gain for bit stream i, at step 28, by passing the frame gain for frame n through an infinite impulse response filter. Finally, at step 30, the invention preferably determines whether the short-term average frame gain for bit stream i is more than 1.5 times the short-term average frame gain of the currently selected output bit stream, select. If so, at step 32, the invention substitutes bit stream i as the new currently output stream. At step 34, the invention then increments to the next frame and continues at step 16.

More particularly, by incorporating the detailed embodiment discussed above with respect to G.723.1, an embodiment of the present invention may be phrased in C-based pseudo-code programming language as follows:

TABLE 2

SPECIFIC APPLICATION OF PREFERRED EMBODIMENT

```
Select=1;
For each stream i
{
    fg = 0;
    If(ActiveFrame = GetBit(i, 2, 2) == 0)
    {
        If(Rate63 = GetBit(i, 1, 1) == 0)
        {
            Olp[0] = GetBits(i, 27, 33) + 18;
            Olp[1] = GetBits(i, 36, 42) + 18;
        }
        For(k = 0; k < 4; k++)
```

TABLE 2-continued

SPECIFIC APPLICATION OF PREFERRED EMBODIMENT

```
        {
            Temp = GetBits(i, 45+k*12, 56+k*12);
            If(Rate63 && (Olp[k>>1] < 58))Temp &= 0x07FF;
        }
    }
    afg[i] = 0.93*afg[i] + 0.07*fg;
    If(afg[i] > 1.5*afg[Select])Select = i
}
```

In this more specific embodiment of the present invention, the variable ActiveFrame is a boolean variable indicating whether a frame gain should be calculated for the current frame or rather whether the frame gain should be automatically considered zero. In this regard, each G.723.1 frame includes a bit labeled VADFLAG_B0 (VAD standing for Voice Activity Detection), which indicates whether the underlying speech signal is quiet. In a normal conversation, when one speaker is not talking, the other speaker hears background noise rather than absolute silence. Consequently, when encoding speech according to G.723.1, if the system determines that no speech is emanating from a given speaker, the system encodes a simulated noise signal into the current frame and clears the VADFLAG to indicate that voice activity is not currently detected. Because G.723.1 simulates the data for such an inactive frame, an excitation parameter is unavailable for use in connection with the present invention. Consequently, in this scenario, the invention beneficially treats the frame gain for the given frame as zero, representing an absence of speech audio for the 30 millisecond time period.

The present invention further recognizes that, by design, successive frames in a G.723.1 bit stream are interdependent. As suggested above, when a G.723.1 bit stream is decoded, excitation and LPC parameters and other such information is obtained from one decoded frame and is in turn used to decode the following frame. This interdependency raises an additional issue in the context of the present invention. Namely, by concatenating discrete G.723.1 frames from separate bit streams, this interdependency is necessarily lost.

More particularly, in existing audio bridges operating under G.723.1, frame interdependency is maintained to the extent necessary, because the incoming bit streams are decoded and an outgoing bit stream is newly encoded for distribution to the conference participants. Thus, in existing audio bridges, when a conference participant receives an output signal from the audio bridge, equipment at the participant's location may decode the bit stream, and the participant may accurately hear the signal that was encoded by the audio bridge.

In contrast, because the present invention beneficially omits the steps of decoding and re-encoding the analog speech component of the G.723.1 bit stream, instead patching together frames from separate bit streams, the interdependency of the successive frames is lost at least in part. As a consequence, errors will predictably arise in the output audio signal. Fortunately, however, it has now been determined that these errors are most pronounced only at the frame switching boundaries and that the errors taper off quickly over time. More particularly, it has been shown that these errors are at most barely audible to the human ear. Therefore, although counterintuitive, switching between bit streams at frame boundaries according to the present invention works well in practice.

Experimental tests of the preferred embodiment have shown that the present invention properly selects the loudest speaker and produces a reliable output signal for distribution to multiple teleconference participants. FIG. 3 illustrates input and output waveforms associated with one such test. In this test, three speakers, 1, 2 and 3, each uttered four test sentences. The waveforms of speech signals generated by speakers 1, 2 and 3 are illustrated respectively in Graphs 3A, 3B and 3C. By design, speaker 1 spoke the loudest for sentence 1, speaker 2 spoke the loudest for sentence 2, and speaker 3 spoke the loudest for sentence 3. For sentence 4, all three speakers spoke at about an equal loudness level. The analog speech signals of each of the speakers were sampled and encoded as G.723.1 bit streams and sent to an audio bridge incorporating the present invention.

The audio bridge produced an output bit stream, which was then decoded and converted into an analog waveform as illustrated in Graph 3D. Graph 3E and Graph 3F illustrate, respectively, the short-term average frame gains calculated by the present invention and the value of "select," the variable defining which speaker's bit stream is currently identified as the loudest at a given instant.

Beneficially, as can be seen by reference to Graph 3D, the present invention successfully routed the bit stream representing speaker 1 as the output for sentence 1, the bit stream representing speaker 2 as the output for sentence 2, and the bit stream representing speaker 3 as the output for sentence 3. Further, since there was no loudest speaker for sentence 4 (all being relatively equal), the invention routed the bit stream associated with the last selected speaker (speaker 3) as the output stream. A comparison of the output analog speech waveform to the respective input analog speech waveforms illustrates the virtual absence of any signal degradation from the present invention.

Figure 4A:
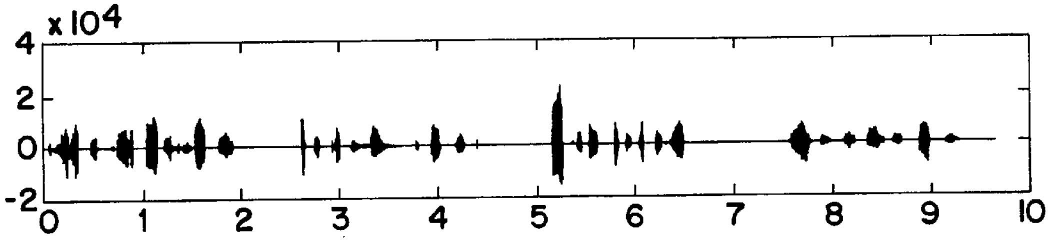
FIG. 4 is depicts a series of graphs illustrating the effects of frame interdependency in the context of the present invention.
Figure 4B:
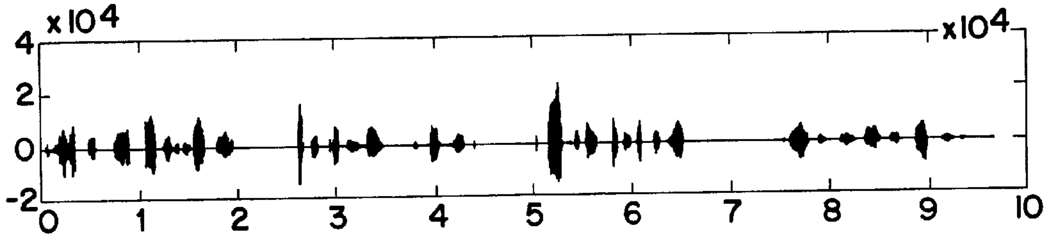
Figure 4C:
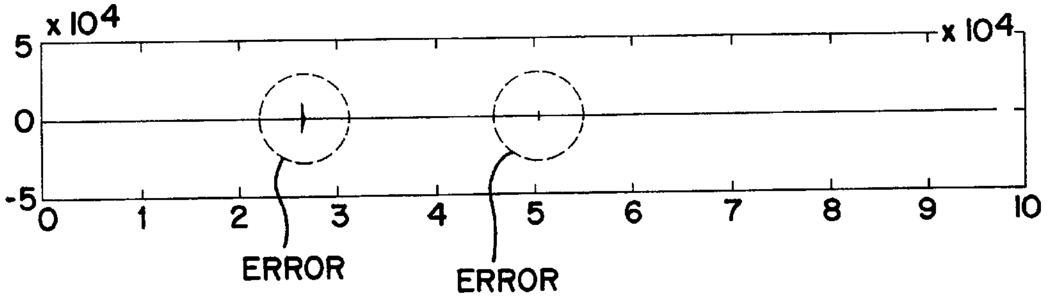

Using the same input signals from the above experiment, FIG. 4 depicts the results of a further experiment showing that the loss of interdependency between successive G.723.1 frames within the present invention results in at most insignificant signal errors. FIG. 4 begins with G.723.1 bit streams representing the speech signals produced by speakers 1, 2 and 3. Graph 4A represents the results of a prior art audio bridge, and Graph 4B represents the results of an audio bridge made in accordance with the present invention.

The illustrate the prior art, the test first decoded each of the incoming bit streams frame by frame and compared the underlying audio signals to select a loudest signal for each 30 millisecond time period. The test then concatenated the selected 30 millisecond speech segments and encoded the concatenated signal into an output G.723.1 bit stream. Finally, the test decoded this output G.723.1 bit stream into an analog waveform, which is depicted as Graph 4A.

To illustrate the present invention, the test compared short-term average frame gains of the three incoming bit streams. For each frame, the test then selected for output the bit stream whose short-term adjusted frame gain was at least 1.5 times that of the currently selected bit stream. For comparison, the test then decoded the output bit stream into an analog waveform, which is depicted as Graph 4B.

Graph 4C depicts the difference between the waveforms in Graphs 3A and 3B and therefore illustrates the errors in the output signal caused by the loss of required G.723.1 frame interdependency. As can be seen, these errors are extremely insignificant, especially when viewed with the understanding that each frame represents only a 30-millisecond time period.

The present invention thus advantageously and successfully selects the loudest speaker from among several incoming G.723.1 bit streams, without decoding the bit streams. Additionally, the present invention may be extended to rank multiple speakers according to their loudness, which might be useful for a variety of applications.

The present invention directly uses the excitation gain of incoming G.723.1 bit streams to estimate the overall energy of the encoded speech signal. Since no decoding is necessary to achieve a comparison between speaker loudness, the present invention is fast and simple. Furthermore, in the preferred embodiment, since the present invention employs only a first order IIR filter to estimate the short-term average, the algorithm produces minimum delay. As exemplified above, experiments have shown that the algorithm incorporated in the preferred embodiment is robust, in the sense that it reliably results in a correct sequential selection of the loudest bit streams. Furthermore, in the specific embodiment described above, the present invention operates effectively with either selected bit rate of the G.723.1 signal.

The present invention thus quickly and efficiently enables a comparison and/or selection of the loudest incoming bit stream in CELP-coded signal. Consequently the invention enables audio bridges to be constructed for multimedia teleconferencing applications, such as H.324/H.323 based video conferencing systems, at a significantly reduced cost.

Preferred embodiments of the present invention have been described above. Those skilled in the art will understand, however, that changes and modifications may be made in these embodiments without departing from the true scope and spirit of the present invention, which is defined by the following claims.

I claim:

1. A method for selecting a loudest speech signal from a plurality of speech signals from a plurality of speakers, said method comprising, in combination the steps of:

(a) receiving a given speech signal from a given speaker, said given speech signal being encoded in a given bit stream by a code excited linear predictive vocoder, said given bit stream defining frames, each one of said frames representing a segment of said given speech signal;

(b) extracting an excitation gain parameter from a current frame of said given bit stream, said current frame of said given bit stream representing a current segment of said given speech signal, said excitation gain parameter defining an excitation energy;

(c) computing a frame gain from said excitation gain parameter, said frame gain being associated with said current frame of said given bit stream, said frame gain being correlated with the total energy in said current segment of said given speech signal;

(d) computing an average frame gain over time for said given bit stream;

(e) determining if said average frame gain over time for said given bit stream from said given speaker exceeds the average frame gain over time for another bit stream from another speaker, and, if so, selecting as a loudest speech signal the signal encoded in said given bit stream; and (f) transmitting said loudest speech signal to said plurality of speakers.

2. A method as claimed in claim 1, wherein computing an average frame gain over time for said given bit stream comprises applying a first order infinite impulse response filter to a sequence of frame gains for said given bit stream.

3. A method as claimed in claim 2, wherein said first order infinite impulse response filter comprises a geometric forgetting factor.

4. A method as claimed in claim 3, wherein said geometric forgetting factor is about 0.93.

5. A method as claimed in claim 1, wherein each of said frames defines a plurality of sub-frames and wherein the step of extracting an excitation gain parameter comprises the step of extracting a plurality of sub-frame gains from said current frame of said given bit stream, each one of said plurality of sub-frame gains representing an excitation energy associated with one of said plurality of sub-frames defined by said current frame.

6. A method as claimed in claim 5, wherein the step of computing a frame gain includes the step of adding together said plurality of sub-frame gains.

7. A method as claimed in claim 5, wherein the step of extracting a sub-frame gain includes the steps of:

reading a value defined by a plurality of bits from a sub-frame in said current frame;

calculating a remainder from said value; and obtaining said sub-frame gain by applying said remainder to a codebook table.

8. A method as claimed in claim 1, wherein determining if said average frame gain over time for said given bit stream exceeds the average frame gain over time for another bit stream comprises determining whether said average frame gain over time for said given bit stream is greater than the average frame gain over time of a bit stream representing a currently selected loudest speech signal.

9. A method as claimed in claim 8, wherein determining whether said average frame gain over time for said given bit stream is greater than the average frame gain over time of said bit stream representing said currently selected loudest speech signal comprises determining whether said average frame gain over time for said given bit stream is no less than 1.5 times as great as the average frame gain over time of said bit stream representing said currently selected loudest speech signal.

10. A method as described in claim 1, wherein said code excited linear predictive vocoder comprises G.723.1.

11. A method for comparing loudness of a plurality of analog speech signals from a plurality of speakers, each said analog speech signal being encoded in a corresponding digital bit stream, said method comprising, in combination, the steps of:

receiving said plurality of analog speech signals from said plurality of speakers, each of said plurality of analog speech signal being encoded into a corresponding digital bit stream, each said digital bit stream including a series of consecutive frames;

extracting from each of a first plurality of said frames a parameter defining an excitation energy;

determining a frame gain for each of a second plurality of said frames in each one of said digital bit streams, said first plurality of said frames being included within said second plurality of said frames, the frame gain for each one of said first plurality of said frames being determined from said parameter extracted therefrom;

for each one of said digital bit streams, calculating an average frame gain over a plurality of frames in said one of said digital bit streams, said average frame gain being an estimated short term average speech energy of the analog speech signal encoded in said one of said digital bit streams;

comparing the average frame gains for all of said digital bit streams from said plurality of speakers to select a loudest analog speech signal; and transmitting said loudest analog speech signal to said plurality of speakers.

12. A method as claimed in claim 11, wherein said digital bit stream is a G.723.1 bit stream.

13. A method as claimed in claim 12, wherein calculating an average frame game comprises a first order impulse response filter to said frame gains.

14. A method as claimed in claim 13, wherein said first order infinite impulse response filter comprises a geometric forgetting factor.

15. A method as claimed in claim 14, wherein said geometric forgetting factor is about 0.93.

16. A method as claimed in claim 11, wherein said second plurality of said frames includes inactive frames, and wherein the frame gain for each one of said inactive frames is determined to be zero.

17. An audio bridge system comprising, in combination:

means for receiving a plurality of speech signals from a plurality of speakers, each of said speech signals being encoded respectively in a digital bit stream by a code excited linear predictive vocoder, each digital bit stream defining frames, each frame representing a segment of one of said speech signals;

a microprocessor;

a set of machine language instructions executable by said microprocessor for:

(a) extracting an excitation gain parameter from a current frame of a given one of said digital bit streams corresponding to a given speech signal from a given one of said speakers, said current frame of said given bit stream representing a current segment of said given speech signal, said excitation gain parameter defining an excitation energy;

(b) computing a frame gain from said excitation gain parameter, said frame gain being associated with said current frame of said given bit stream, said frame gain being correlated with the total energy in said current segment of said given speech signal;

(c) computing an average frame gain over time for said given bit stream; and (d) determining if said average frame gain over time for said given bit stream from said given speaker exceeds the average frame gain over time for another bit stream from another speaker, and, if so, selecting as a loudest speech signal the signal encoded in said given bit stream; and means for transmitting said loudest speech signal to said plurality of speakers.

18. A system as claimed in claim 17, wherein computing an average frame gain over time for said given bit stream comprises applying a first order infinite impulse response filter to a sequence of frame gains for said given bit stream.

19. A system as claimed in claim 18, wherein said first order infinite impulse response filter comprises a geometric forgetting factor.

20. A system as claimed in claim 19, wherein said geometric forgetting factor is about 0.93.

21. A system as claimed in claim 17, wherein each of said frames defines a plurality of sub-frames and wherein the step of extracting an excitation gain parameter comprises the step of extracting a plurality of sub-frame gains from said current frame of said given bit stream, each one of said plurality of sub-frame gains representing an excitation energy associated with one of said plurality of sub-frames defined by said current frame.

22. A system as claimed in claim 21, wherein the step of computing a frame gain includes the step of adding together said plurality of sub-frame gains.

23. A system as claimed in claim 21, wherein the step of extracting a sub-frame gain includes the step of:

reading a value defined by a plurality of bits from a sub-frame in said current frame;

calculating a remainder from said value; and obtaining said sub-frame gain by applying said remainder to a codebook table.

24. A system as claimed in claim 17, wherein said means for receiving said plurality of speech signals from said plurality of speakers includes a plurality of modems.

25. A system as claimed in claim 24, wherein each of said modems executes its own copy of said set of machine language instructions.

26. A system as claimed in claim 17, wherein said code excited linear predictive vocoder comprises G.723.1.

27. An audio bridge system comprising, in combination:

means for receiving a plurality of analog speech signals from a plurality of speakers, each of said analog speech signals being encoded in a corresponding digital bit stream, each of said digital bit streams including a series of consecutive frames;

a microprocessor;

a set of machine language instructions executable by said microprocessor for:

(i) extracting from each of a first plurality of said frames a parameter defining an excitation energy;

(ii) determining a frame gain for each of a second plurality of said frames in each one of said digital bit streams, said first plurality of said frames being included within said second plurality of said frames, the frame gain for each one of said first plurality of said frames being determined from said parameter extracted therefrom, (iii) for each one of said digital bit streams, calculating an average frame gain over a plurality of frames in said one of said digital bit streams, said average frame gain being an estimated short term average speech energy of the analog speech signal encoded in said one of said digital bit streams, and (iv) comparing the average frame gains for all of said given digital bit streams from said plurality of speakers to select a loudest analog speech signal; and means for transmitting said loudest analog speech signal to said plurality of speakers.

28. A system as claimed in claim 27, wherein said digital bit stream comprises a G.723.1 bit stream.

29. A system as claimed in claim 28, wherein said average frame gain is computed at least in part by applying an infinite impulse response filter to said digital bit stream.

30. A system as claimed in claim 29, wherein said first order infinite impulse response filter comprises a geometric forgetting factor.

31. A system as claimed in claim 30, wherein said geometric forgetting factor is about 0.93.

32. A system as claimed in claim 27, wherein said means for receiving said plurality of speech signals from said plurality of speakers includes a plurality of modems.

33. A system as claimed in claim 32, wherein each of said modems executes its own copy of said set of machine language instructions.

34. A method as claimed in claim 27, wherein said second plurality of said frames includes inactive frames, and wherein the frame gain for each one of said inactive frames is determined to be zero.

* * * * *